UNITED STATES PATENT OFFICE.

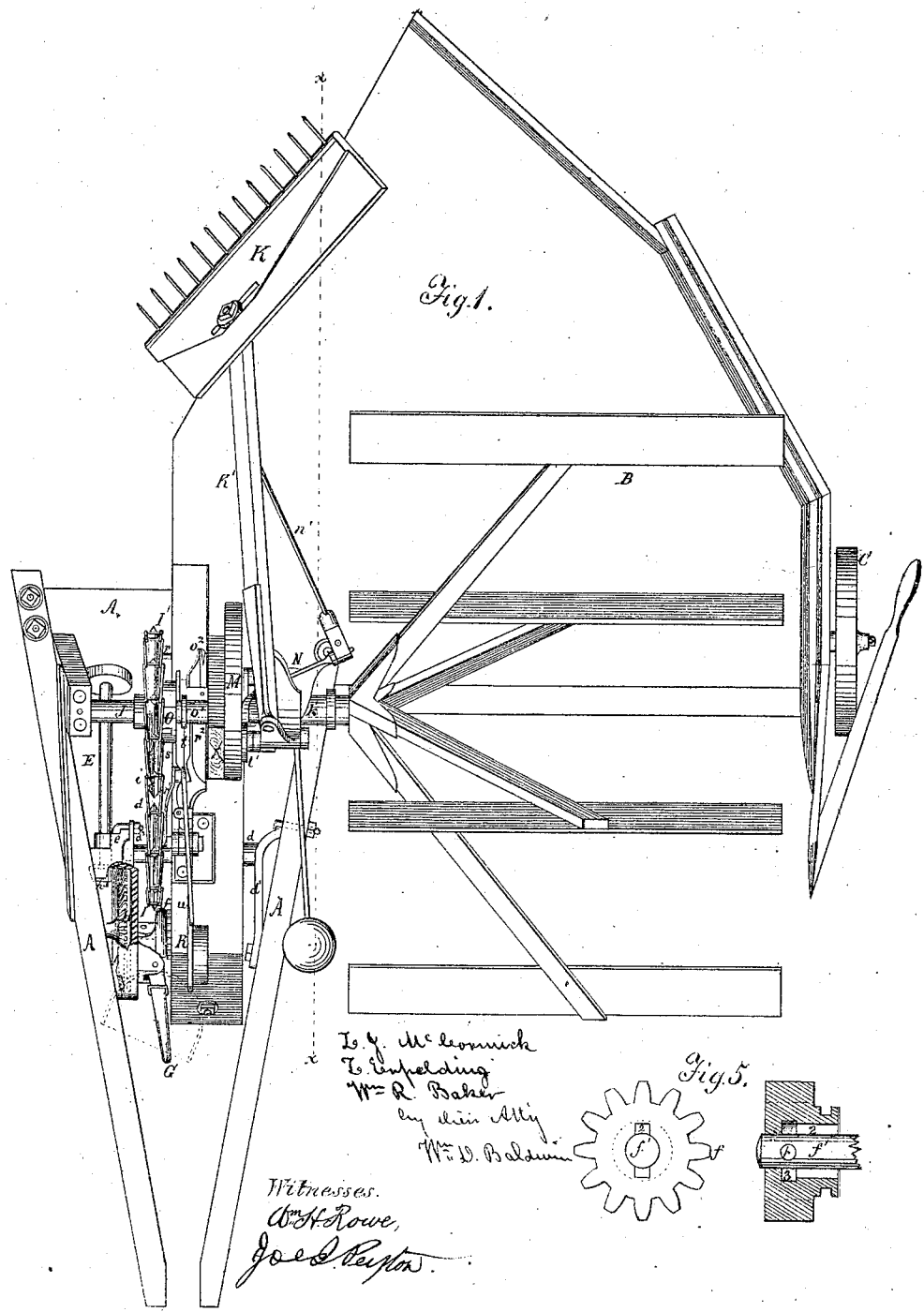

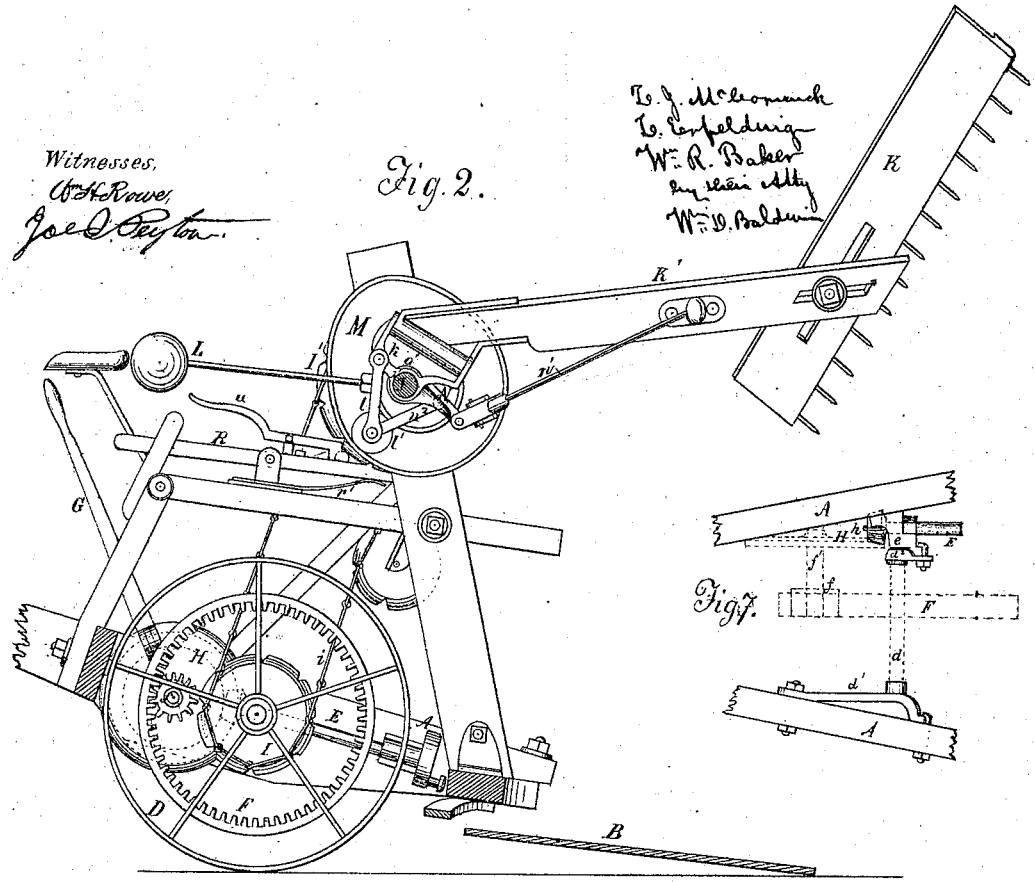
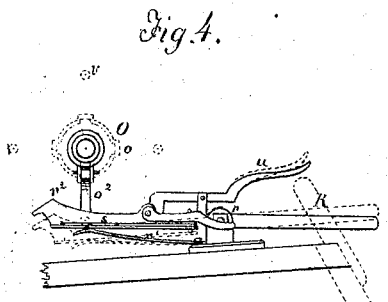
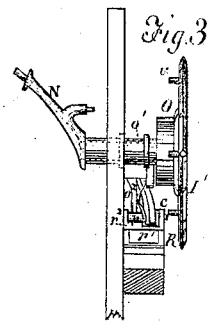
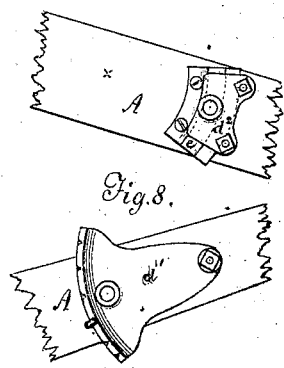
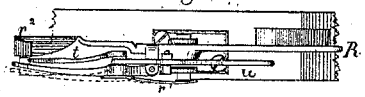

LEANDER J. McCORMICK, WILLIAM R. BAKER, AND LAMBERT ERPELDING, OF CHICAGO, ILLINOIS, ASSIGNORS TO C. H. McCORMICK & BROTHER, OF SAME PLACE.

IMPROVEMENT IN HARVESTERS.

Specification forming part of Letters Patent No. 104,331, dated June 14, 1870.

*To all whom it may concern:*

Be it known that we, LEANDER J. McCORMICK, WILLIAM R. BAKER, and LAMBERT ERPELDING, all of Chicago, in the county of Cook and State of Illinois, have invented certain new and useful Improvements in Harvesters, of which the following is a full, clear, and exact description, reference being had to the accompanying drawing which makes part of this specification, and in which—

Figure 1 is a plan or top view of a machine embracing all the improvements herein claimed; Fig. 2, a side view of the same, partly in section, at the line $x\,x$ of Fig. 1; Fig. 3, a rear elevation of the rake driving and shipping mechanism detached; Fig. 4, a side elevation of the same. Fig. 5 shows the details of the devices for throwing the cutters into and out of gear; Fig. 6, a plan view of the rake-shipping mechanism, detached; Fig. 7, a diagram, showing portions of the frame and gearing; Fig. 8, views of the sector-plate or radius-bar and slide-block in which the main driving-shaft is mounted.

The first part of our invention relates to the gearing. Its object is to secure a compact arrangement of the gearing and a wide range of vertical adjustment for the main frame and cutting apparatus; and the improvement consists in arranging the gearing within the frame in such manner that, while the axes of the main gear-wheel and of the crank-shaft intersect, they can pass each other without contact.

The next part of our invention relates to the rake. Its object is to drive an automatic harvester-rake directly from a chain-wheel or sprocket-pulley, and thus to avoid the torsion of the rake-shaft; and the improvement consists in combining a sprocket-pulley on the main axle with a sprocket-wheel on the reel-shaft, (by means of a chain encircling the two,) the rake-driving mechanism being connected directly with the sprocket-wheel.

The object of the next part of our invention is to stop and start the rake, (either automatically or by hand,) while the reel with which it is connected continues to run; and our improvement consists in combining rake-shipping mechanism with a lever operated by the driver.

The object of the next branch of our invention is to vary the size of the bundles; and our improvement consists in varying the number of the revolutions of the rake, relatively to those of the driving-wheel, by means of pins on the sprocket-wheel acting on the rake-shipping mechanism.

In the accompanying drawing our improvements are shown as adapted to the well-known McCormick self-raking reaper. Some of these improvements, however, obviously may be applied to machines of different construction.

A represents the main frame, B the platform, and C the grain-wheel.

The driving-wheel D is mounted on a shaft, $d$, the grain-end of which runs in a bearing in a radius-bar, $d^1$, on the inner side of the main frame, while the stubble-end of this shaft runs in a bearing in a sliding block, $d^2$, moving in an arc-shaped guide, $e$, having a curve of the same radius as the radius-bar $d^1$.

The guide $e$ is formed on the box or bearing which sustains the crank-shaft E.

An internally-geared spur-wheel, F, drives a spur-pinion, $f$, on a counter-shaft, $f'$.

This pinion is thrown into or out of gear by means of the lever G, which slides the pinion endwise on the shaft.

This shaft carries a stud or pin, 1, which locks in the recess 2, in the pinion $f$, when it is in gear, but runs loosely in another recess, 3, in said pinion, when out of gear. (See Fig. 5.) This constitutes a very convenient shipping arrangement.

A bevel-wheel, H, on the counter-shaft drives a spur-pinion, $h$, on the crank-shaft, and thus actuates the cutters. The bevel-wheel H, it will be observed, is in line with the sliding block $d^2$ and guide $e$, while the crank-shaft lies outside of it. By this means the frame can be raised or lowered by means of the radius-bar $d^1$ and block $d^2$, without the main axle striking the crank-shaft.

A sprocket-pulley, I, on the main axle is encircled by a chain, $i$, which passes over a sprocket-wheel, I', on the reel-shaft J. The sprocket-wheel is fastened on and revolves with the reel-shaft.

The rake-head K is mounted on an inclined arm, K', pivoted in bearings $k$, about at right angles to the reel-shaft. The bracket in which these bearings are formed is fixed on a sleeve, $k'$, revolving loosely on the reel-shaft.

An arm, $l$, pivoted on this bracket, carries a friction-roller, $l'$, running in a cam-groove in a plate, M, fixed on the reel-support. A counter-balance, L, is also attached to this arm.

An inclined arm, N, is mounted on a collar, $o^1$, turning loosely on the reel-shaft, independently of the collar which carries the rake. A rod, $n^1$, connects this arm with the rake-arm, and a link, $n^2$, connects it with the arm $l$, carrying the friction-roller.

By this means the rake, when in gear, is carried round with the reel, and at proper intervals turned on its trunnions, at right angles to the rake-shaft, so as to deliver the grain behind the driving-wheel, and out of the path of the team in cutting the succeeding swath.

In order to drive the rake directly from the sprocket-wheel, instead of from the reel-shaft, we form a ring, O, on the sprocket-wheel hub, having four recesses, $o$, arranged equidistantly around its periphery, as shown in Figs. 3 and 4.

A collar, $o^1$, which carries the inclined arm N, which actuates the rake, also carries an elbow-lever, $o^2$, ordinarily held in one of the recesses $o$ by a spring.

A lever, R, rocks on a fulcrum, $r$, and is ordinarily held up by a spring, $r^1$. (See Fig. 2.) This lever has an incline, $r^2$, Fig. 3, on its upper side, forming a groove, through which the elbow-lever $o^2$ passes during a part of its circuit.

Two guide-plates, $s\ t$, are set up edgewise and pivoted at their forward ends, to play laterally on the rocking lever, being ordinarily pressed inward by a spring.

A wedge on a rocking lever, $u$, enters the space between these plates, and forces them out laterally.

When this wedge is removed, the elbow-lever $o^2$ is forced to one side by the incline $r^2$, and its nose is lifted from the recess $o$. Consequently the rake stops, and, owing to the relative arrangement of this elbow-lever and the rake-arm, this stoppage always occurs just as the gavel is discharged from the platform. The reel continues to run.

To start the rake again, the plate $s$ is forced out laterally by the wedge. When this is done a pin, $v$, on the sprocket-wheel bears down the rear end of the rocking lever R, and releases the elbow-lever $o^2$, whose spring immediately locks it in the next recess in the ring O that comes round. The rake then continues to work until the wedge is removed.

By placing four pins equidistantly in the sprocket-wheel, the rake will stand still during one-fourth of a revolution of the reel. When two equidistant pins are used, the rake will remain still during one-half a revolution of the reel. When one pin only is used, the reel will make two revolutions to every one of the rake. We are thus enabled automatically to regulate the size of the gavels, or to stop the rake at the end of any revolution by hand, and thus to carry the gavel around a corner.

When the rear end of the rocking lever R is depressed, the rake and reel revolve together without stopping.

What we claim as our invention, and desire to secure by Letters Patent, is—

1. The box $e$, arranged as set forth, to serve as a bearing both for the crank-shaft and for the slide which supports the main axle, thus allowing the main axle to pass the crank-shaft, to adjust the height of cut.

2. The combination of the sprocket-wheel on the reel-shaft with the clutch mechanism, for driving the rake directly from the sprocket-wheel instead of from the reel-shaft, all these parts being constructed and operating substantially as set forth.

3. The combination of the reel, the rake, the rocking-lever, and the shifting-guides, all these parts being constructed and operating substantially as set forth, to enable the driver to throw the rake into gear, relatively to the reel-beaters, at the proper moment.

4. The combination of the continuously-rotating reel, the rake turning loosely on the reel-shaft, the spring elbow-lever on the rake-collar, the pins on the sprocket-wheel, and the shifting-guides, all these parts being constructed and operating substantially as hereinbefore set forth, for the purpose of automatically regulating the size of the gavels.

In testimony whereof we have hereunto subscribed our names.

L. J. McCORMICK.
WM. R. BAKER.
L. ERPELDING.

Witnesses:
C. A. SPRING, Jr.,
WM. JNO. HANNA.